US007334313B2

(12) United States Patent
Albert Seseña et al.

(10) Patent No.: US 7,334,313 B2
(45) Date of Patent: Feb. 26, 2008

(54) NUMERIC CONTROL BORE FOR BORING AN EYEGLASS LENS AND CORRESPONDING METHOD

(75) Inventors: Santiago Albert Seseña, Teia (ES); Sergio Fructuoso González, Santpedor (ES); Carlos Pérez Ribera, Barcelona (ES)

(73) Assignee: Indo Internacional, S.A., L'Hospitalet de Liobregat (Barcelona) (ES)

( * ) Notice: Subject to any disclaimer, the term of this patent is extended or adjusted under 35 U.S.C. 154(b) by 326 days.

(21) Appl. No.: 11/108,643

(22) Filed: Apr. 19, 2005

(65) Prior Publication Data

US 2005/0230132 A1 Oct. 20, 2005

(51) Int. Cl.
*B23P 23/00* (2006.01)
*B23B 39/00* (2006.01)

(52) U.S. Cl. ........................ 29/558; 29/26 A; 408/236; 408/103; 408/87; 408/89; 409/201; 451/42; 451/255

(58) Field of Classification Search .......... 29/557–558, 29/26 A, 56.5; 408/87, 89, 103, 236, 237, 408/71, 1 R; 409/131–132, 201, 211, 216, 409/164, 165; 451/42, 255–256, 384
See application file for complete search history.

(56) References Cited

U.S. PATENT DOCUMENTS 3,232,141 A * 2/1966 Swanson et al. .............. 408/90
4,589,174 A * 5/1986 Allen ......................... 29/33 R
6,056,633 A * 5/2000 Sesena et al. ............... 451/384
7,185,412 B2 * 3/2007 Penick et al. ................ 29/560
2002/0122705 A1 9/2002 Wehmeier
2004/0179909 A1 * 9/2004 Wehmeier .................... 408/93

FOREIGN PATENT DOCUMENTS

| | | | |
|---|---|---|---|
| EP | 1 310 326 A | | 5/2003 |
| EP | 1 510 290 A | | 3/2005 |
| FR | 946 661 A | | 6/1949 |
| JP | 08 155945 A | | 6/1996 |
| JP | 2004-009201 A | * | 1/2004 |

OTHER PUBLICATIONS

Machine Translation of JP-2004-009201-A, 29 pages.*

* cited by examiner

*Primary Examiner*—Erica Cadugan
(74) *Attorney, Agent, or Firm*—Sughrue Mion, PLLC

(57) ABSTRACT

Numeric control bore for boring an eyeglass lens and corresponding method. The bore comprises a bedplate (1), attachment device (3) for the lens (5), rotation device (9) for the lens (5) according to a first axis (7) (first degree of freedom), and a support column (11) with a head (15), wherein the attachment device (3) and the support column (11) can be moved between each other (second degree of freedom). The support column (11) has a first end linked to the bedplate (1) being capable of rotating about a second end (third degree of freedom) and the head (15) is linked to the column (11) by translation structure (fourth degree of freedom). The apparatus only has these four degrees of freedom in order to fix the relative position between the head (15) and the lens (5).

9 Claims, 9 Drawing Sheets

NUMERIC CONTROL BORE FOR BORING AN EYEGLASS LENS AND CORRESPONDING METHOD

FIELD OF THE INVENTION

This invention relates to a numeric control bore for boring an eyeglass lens and a machining method of an eyeglass lens.

STATE OF THE ART

The numeric control bores for boring eyeglass lenses are known. Often the eyeglass lenses have holes, wherein various elements are inserted, as bridges, rods, etc. This is particularly the case of the so-called "without frame" or "airframes". In these cases, the lens is not wrapped by a structure to which the rods and the connection jumper are mounted between both lenses but these elements are mounted, for example, by means of screws, directly to the lenses. To this end, it is necessary to pierce holes in the lens, wherein the corresponding screws can be inserted.

The Spanish patent ES 2.133.828, published on 1st May 1998, discloses an apparatus for polishing, boring, cutting and welding eyeglass lenses. This apparatus has a machining head comprising an apparatus generating a beam of laser rays or an electron beam suitable for being displaced along all the surface of an ophthalmic lens. Nevertheless, this apparatus has five degrees of freedom to displace the head along the lens surface and, additionally, occupies a space of great dimensions.

SUMMARY OF THE INVENTION

The invention aims to overcome these drawbacks. A numeric control bore for boring an eyeglass lens achieves this purpose characterised in that it comprises a support bedplate, it comprises attachment means of the lens in a first position, it comprises rotation means of the lens according to a first rotating axis perpendicular to the lens plane defined by the lens, defining then a first degree of freedom, It comprises a support column with a machining head, the attachment means and the support column are suitable for being displaced one respect the other according to a direction comprised in the lens plane, so defining a second degree of freedom, the support column has a first end linked to a bedplate being able to rotate around a second rotating axis parallel to the lens plane, defining a third degree of freedom the head is linked to a column through translation means able to translate the head respect to the column, defining a fourth degree of freedom, having the apparatus four degrees of freedom solely to attach the relative position between the head and the lens.

Indeed, the bore according to the invention, requires one degree less of freedom than the known bores in the state of the art, with equal performances. That leads to save both in complexity and cost, as it is required one actuator less. The rotation means of the lens together with the attachment means allow moving the lens according to the polar coordinates, so that it is possible to position any point of the surface of the lens in a predetermined site. On the other hand, the support column can be rotated in a desired angle, so that the cutting tool contacts the surface of the lens with said desired angle. Usually it is interesting that the holes are made perpendicular to the lens surface, and this can be carried out with the bore according to the invention in a simple and efficient way.

The relative displacing moment between the attachment means and the support column is preferably carried out by the movement of the attachment means. Nevertheless, it could be also possible that the attachment means are fixed in the bedplate and that the attachment column, besides being capable of rotating about the second axis, would be capable of moving along the bedplate, so that the relative displacement between the support column and the attachment means would take place.

Additionally, the bore according to the invention is capable of positioning the machining tool in any position and in any angle with respect to the lens surface.

Usually, the bore will be arranged so that the attachment means keep the lens in a first position that will be horizontal, that is, that the lens plane will be horizontal, and the rotation means will have the first rotating axis that will be vertical. Furthermore, the first end of the support column, the one linked to the bedplate, will be the lower end. However, all that consists in a preferred embodiment of the invention that does not exclude the possibility of other geometries, for example by rotating all the elements 90°.

The attachment means have contact points that are the ones in contact with the lens.

Preferably, the second axis is arranged at a height equal or lower than the upper end of the lens. In fact, that allows the bore according to the invention would be particularly compact, as the cinematic movements made have small dimensions with respect to the ones made by the bores of the state of the art. The lens surface is approximately spherical. Thus, the bore head should travel a spherical surface practically matching the spherical surface of the less. To this end, the bore head (and consequently the support column) must rotate about a rotating axis arranged in the centre of the sphere defined by the lens surface. In this way, the bore head will always move in its rotation at a minimum distance of the lens surface and will not require any complex translation movements, as in the case of the Spanish patent ES 2.113.828, previously cited. In reality, the lens surface is not perfectly spherical, but bores of reduced dimensions can be obtained by moving the second rotating axis downward, as near as possible to the approximate place where the rotation centre of the lens would be. In this sense, it is preferred to arrange the second rotation axis beneath the upper end of the lens or, what is approximately the same, beneath the contact point of the attachment means.

Preferably, the bore according to the invention has feeler means of the lens surface working in the normal direction to said lens surface. In fact, in this way the bore can know at any moment the position of the lens surface given that, as it has been previously said, the actual lens surfaces are all slightly different between them, due, among other reasons, to the optical characteristics that they incorporate. By knowing the exact position of the lens surface, the bore can both position the head and make the hole (or in general the machining operation that corresponds) with more accuracy.

Advantageously, the feeler means act on the lens surface in the translation direction of the head, that is, in the direction of the tool axis. In this way, the feeler means can be included in the same support column, or even in the same head, and the reading of them could serve as a direct reference for the head movement, that will be made in the same direction.

Preferably, the bore comprises second attachment means of said lens in a second position, where said lens in said second position has its lens plane rotated 90° with respect to the lens plane of the lens when it is in said first position. These second attachment means are preferably a removable fitting that can be mounted on the first attachment means, so that the same mechanisms and actuators that are used for moving the first attachment means can serve to move the second attachment means. These second attachment means allow to rotate the lens 90° with respect to the head, allowing to carry out the machined operations in non accessible places when the lens is arranged in the first attachment means, or with special angles that cannot be reached by the head when the lens is arranged in the first attachment means.

The invention aims also to provide a machined method of an eyeglass lens in a numeric control bore according to the invention characterised in that it comprises the following steps:

positioning and attachment of said lens in said bore, carrying out at least a machining operation of the group formed by boring, blind hole milling, groove pin milling, recess, carved, polished, contour milling, contour bevelling, contour grooving and edge planing, in said bore, removing said lens from said bore.

Actually, the bore according to the invention has furthermore the advantage of being extremely versatile, so that it allows carrying out a plurality of operations with it. This fact allows reducing the number of necessary apparatus in order to carry out a series of operations necessary for preparing eyeglass lenses. Another additional advantage is that preferably the machining method can comprise two or more of the machining operations previously indicated in a consecutive form. In this case, with a unique operation of the positioning and attachment of the lens in the bore, several machining operations can be carried out on the lens, whereby positioning and attachment (and removing) operations of the lens can be saved.

Furthermore, another advantage either of the bore and of the method according to the invention is that it is possible to at least carry out two of the machining operations previously cited in a simultaneous way, as it will be further described now.

Another advantage either of the bore and of the method according to the invention is that the head can be rotated a certain angle during the machining operation, so that the cutting tool rotates about an axis forming a not null angle with the first rotating axis, and that this specific angle can be modified during the machining operation, as it will be described now.

BRIEF DESCRIPTION OF THE DRAWINGS

Other advantages and characteristics of the invention are observed from the following description, wherein, without any limiting character, preferred embodiments of the invention are described, making reference to the annexed drawings. The figures show.

DETAILED DESCRIPTION OF SOME EMBODIMENTS OF THE INVENTION

Figure 1:
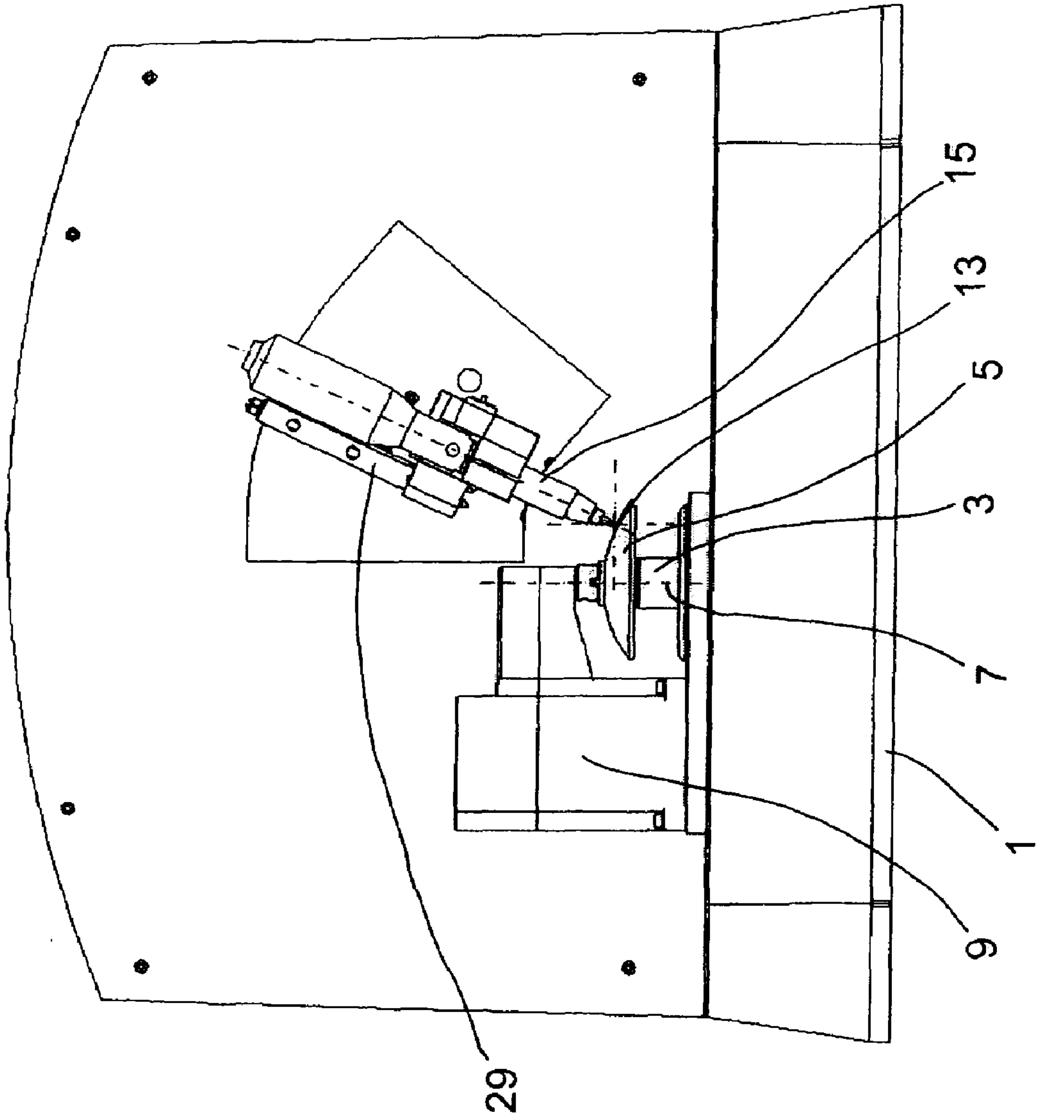
FIG. 1, front elevation view of a bore according to the invention.

In FIGS. 1-4, it is shown a numeric control bore according to the invention. The bore has a support bedplate 1, on which attachment means 3 are mounted, clamping lens 5 so that its lens plane is substantially horizontal. The attachment means 3 comprise a suction pad and an attachment axis protruding from said suction pad and which, in a known way by a person skilled in the art, allows to define the position and the attachment angle of the suction pad with respect to the lens 5. The attachment means 3 form an C-shaped arch and lens 5 is fixed between their open ends, rotatable about the first upright rotating axis 7 coinciding with the attachment axis of the suction pad. Thanks to the rotation means 9 lens 5 can be rotated about the first rotating axis 7 as required. In this way, it is possible to determine the angle position of lens 5 at any moment, constituting the first degree of freedom of the bore.

The assembly formed by the attachment means 3 and the rotation means 9 are mounted on the carrier capable of moving horizontally, parallel to the lens plane, along which it constitutes a second degree of freedom.

The bore further comprises a support column 11 linked by its lower end to the bedplate 1 and can rotate about a second rotation axis that is horizontal, i.e. parallel to the lens plane. This rotation defines the third degree of freedom of the bore.

The support column 11 has a head 15 linked to it, moveable along the support column 11 thanks to the means of translation 17. In the end of the head 15 is arranged the tool 19 responsible of carrying out the corresponding machining operation. This head movement 15 along the support column 11 is the fourth degree of freedom of the bore.

As it can be observed with these four degrees of freedom it is possible to locate the tool 19 at any point of the upper surface of the lens 5 and with any angle of inclination of the tool 19 (particularly with any angle of inclination of the rotation axis of the tool 19) with respect to the perpendicular to the surface of the lens 5 in the contact point. As it has been previously indicated, the arrangement of the second rotation axis 13 in a place near the centre of the lens 5 and, in any case, lower than the upper limit of the surface of the lens 5, allows to reduce the dimension of the movements of the head 15, and it is translated into a more reduced size of the bore.

Figure 2:
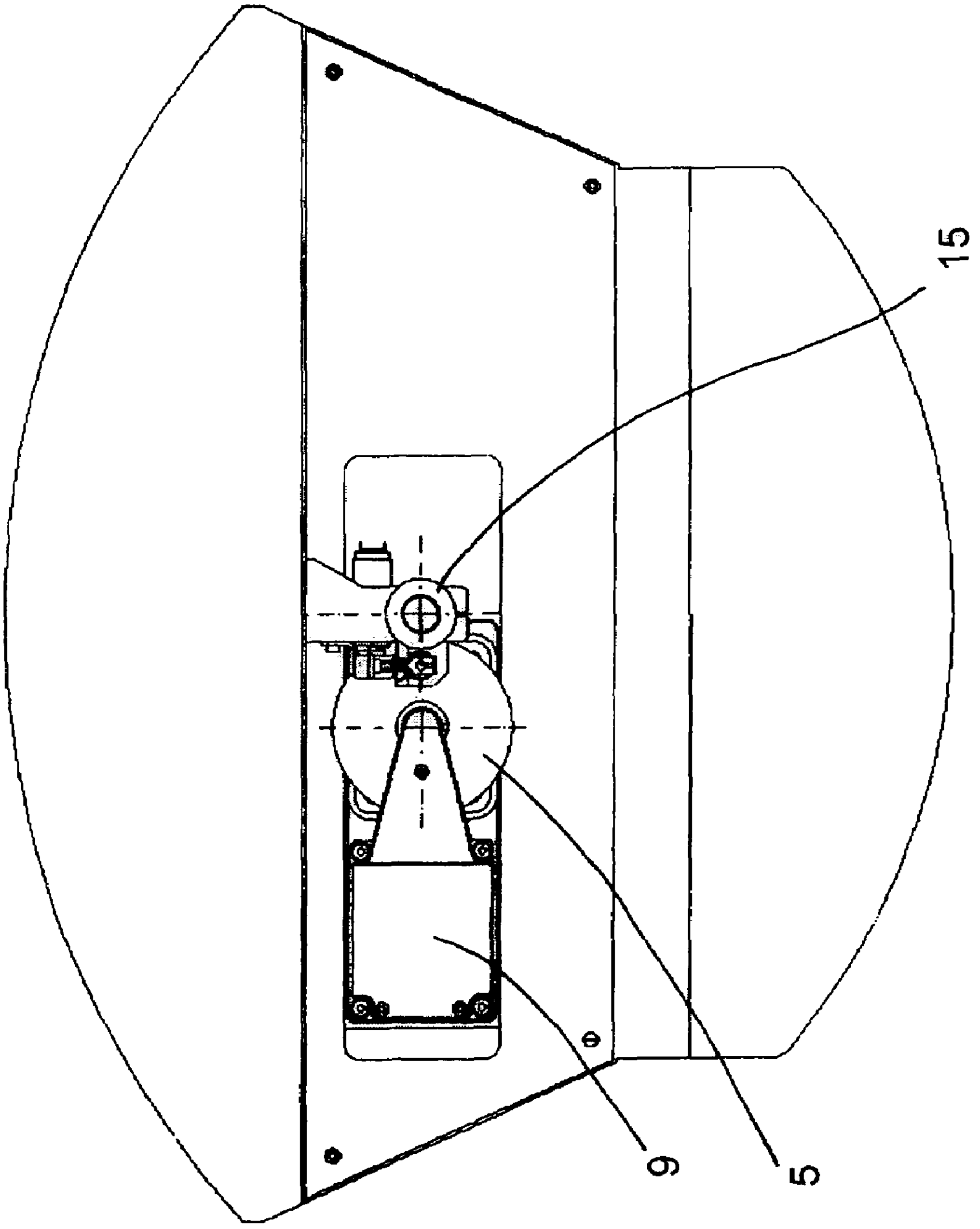
FIG. 2, plant view of the bore of FIG. 1.
Figure 3:
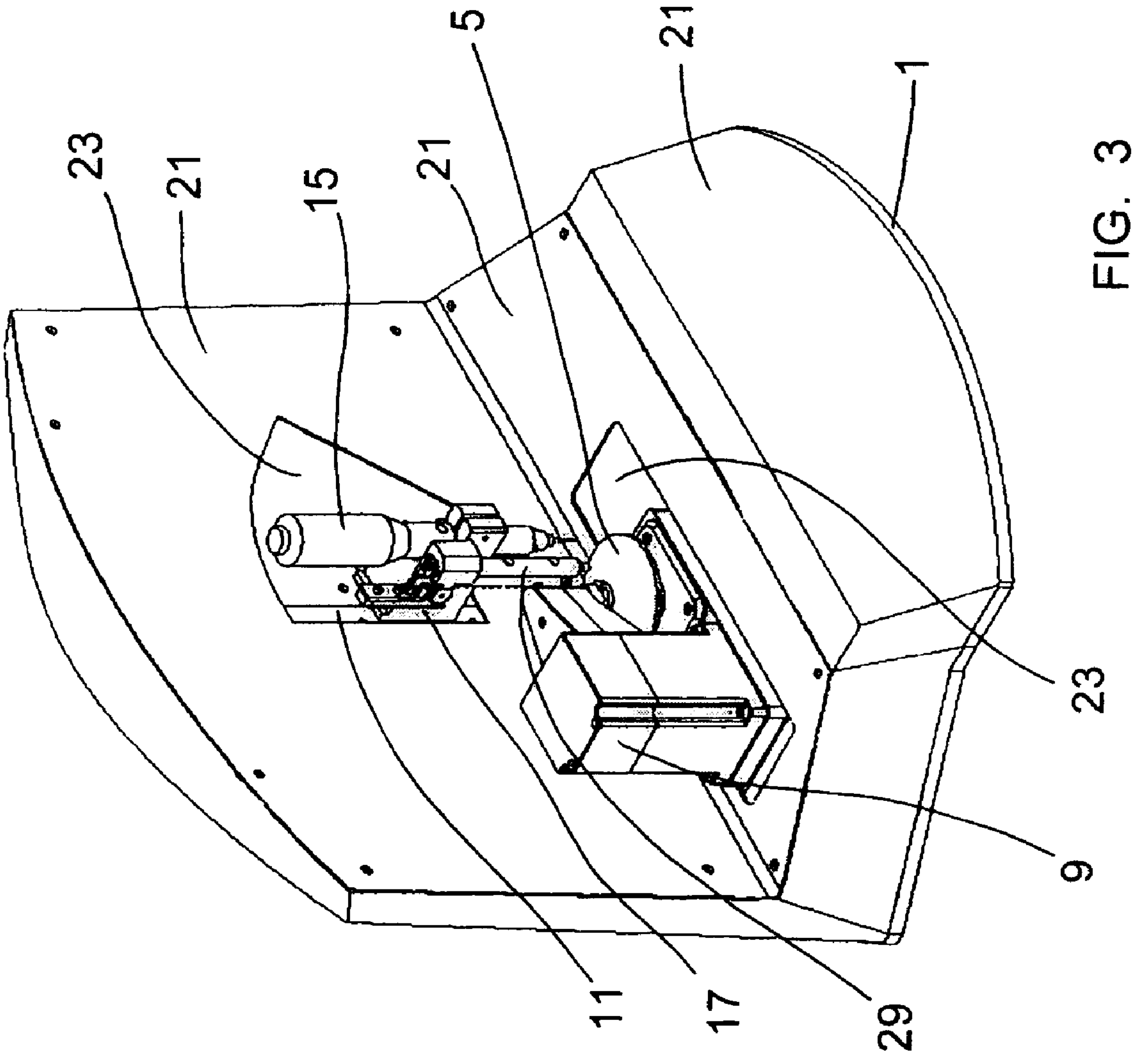
FIG. 3, perspective view of the bore of FIG. 1
Figure 4:
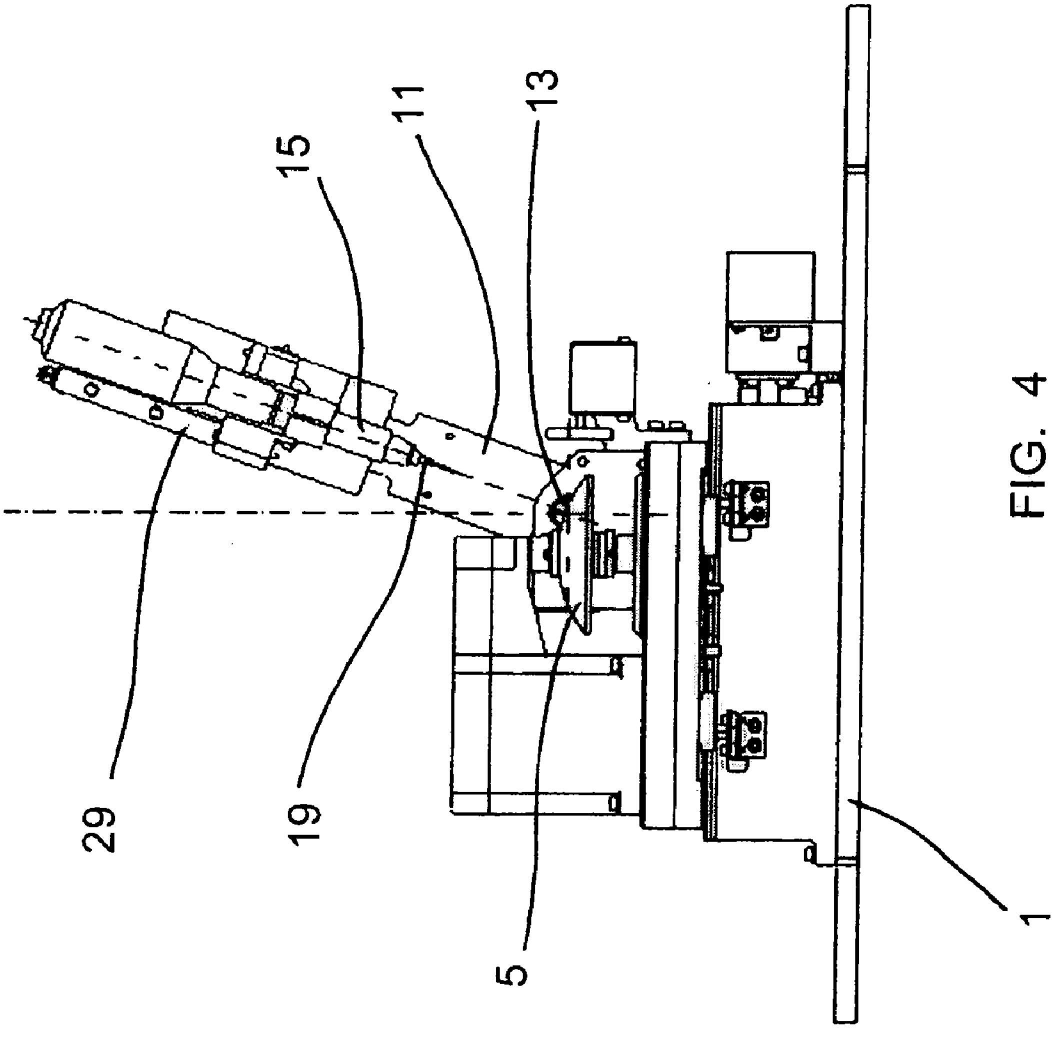
FIG. 4, front elevation view of the bore of FIG. 1, without the protection plate.

In FIGS. 1, 2 and 3 the bore is represented with protection plates 21 wherein windows 23 are cut in order to make the different movements of the moveable elements above mentioned. In FIG. 4, it is shown the bore without the protection plates 21, and it is more clearly observed the second rotation axis 13 and its exact position beneath the upper edge of the lens 5.

Figure 5:
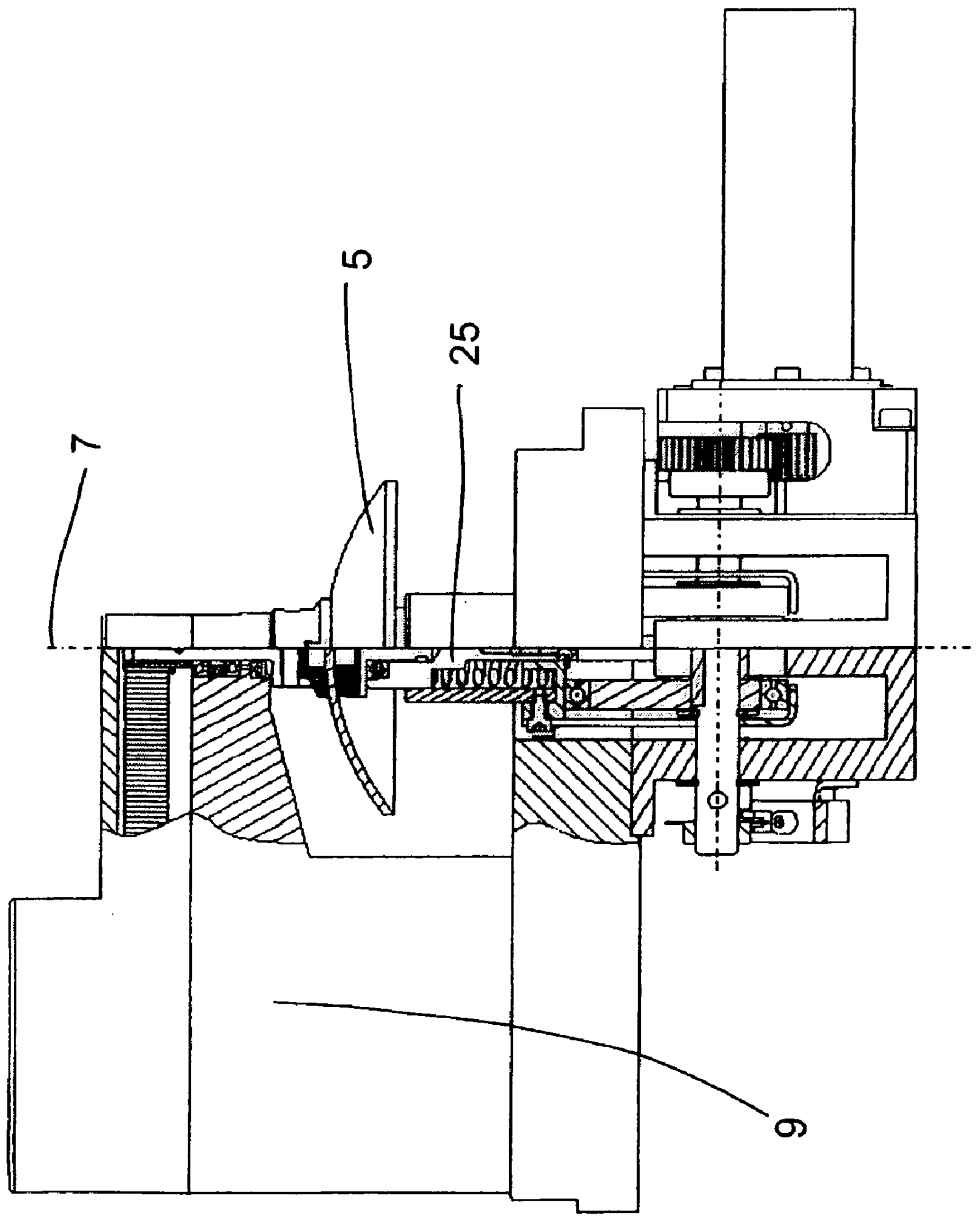
FIG. 5, front elevation view, enlarged and partially sectioned, of attachment means.

In FIG. 5 it is observed with more detail the attachment means 3 and the rotation means 9. The attachment means 3 comprise means capable of withholding the suction pad fixed to the external surface of lens 5 in the upper part of the C formed by the attachment means 3. In the lower part of the C there is a piston 25 exerting an upright upwardly force that clutches the lens 5 against the upper part of the C. The upper end of the piston 25 can freely rotate about a vertical axis, so that the lens 5 can follow the turns to which the suction pad is forced by the rotation means 9.

Figure 6:
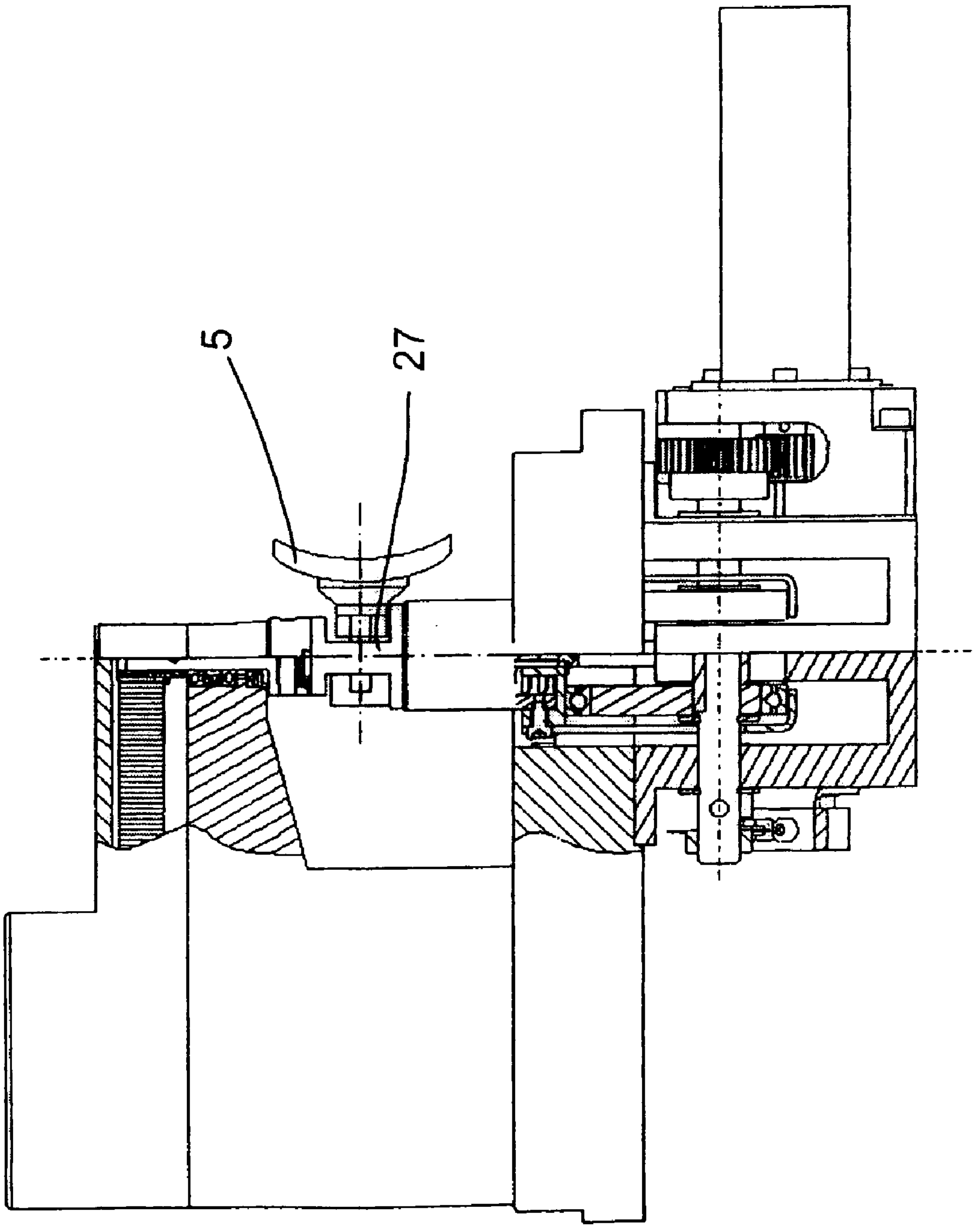
FIG. 6, an elevation front view, enlarged and partially sectioned, of attachment means of FIG. 5, with second clamping means according to the invention.
Figure 15:
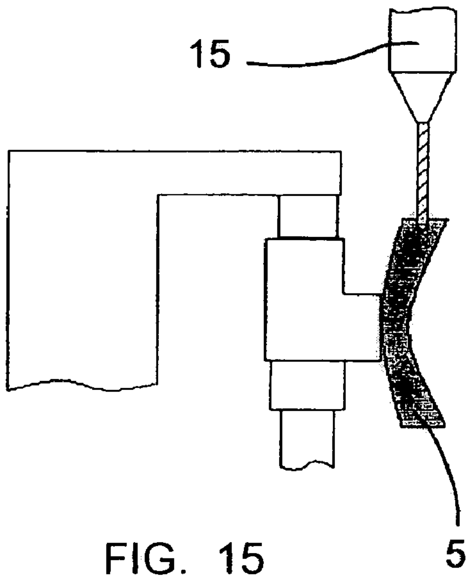
FIG. 15, a schematic view of a machining operation with a bore with second attachment means.

In FIG. 6 it is observed the attachment means 3 and the rotation means 9 of FIG. 5 to which it is included the second attachment means 27 that, on the one hand, are connected to the rotation means 9 and, on the other hand, they support the axis of the suction pad that withholds the lens 5 so that said axis is horizontal. As a consequence the plane of the lens 5 is substantially vertical. The lens 5 can be moved and rotated as it has been previously described, but the head 15 can access to certain spots of the lens 5 and/or with certain angles that in the other case were not possible. So, for example, FIG. 15 shows a boring operation made parallel to the plane of the lens, that can be carried out without being necessary that the head 15 is capable of rotating until a completely horizontal position. Likewise it would be possible to make holes that would be parallel to the tangent of lens 5 in the edge thereof, and even machined operations in the internal face of the lens 5 could be made, if necessary.

The feeler means 29 are arranged in the support column 11, so that they can operate in a substantially normal direction to the lens surface thanks to the turn of the support column about the second rotation axis 13. Furthermore, the feeler means are moveable along the support column 11, parallel to the translation direction of the head. Thus, the feeler means 29 can exactly determine the contact point between the tool 19 and the surface of the lens 5.

Figure 7:
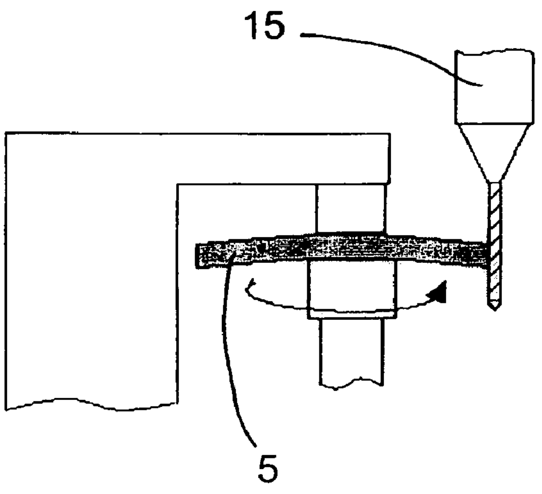
FIGS. 7-14, a schematic view of different machining operations carried out with a bore according to the invention.

FIGS. 7-14 show schematically examples of some machining operations that can be carried out with a bore according to the invention, apart from the boring operations at any angle, that have been previously commented. It can be observed, on the one hand, that with a single equipment very different operations can be carried out, on the other, that a plurality of operations can be carried out with a tool shifting 19, and on the other hand different operations can be simultaneously carried out:

FIG. 7 shows an operation of contour milling process

Figure 8:
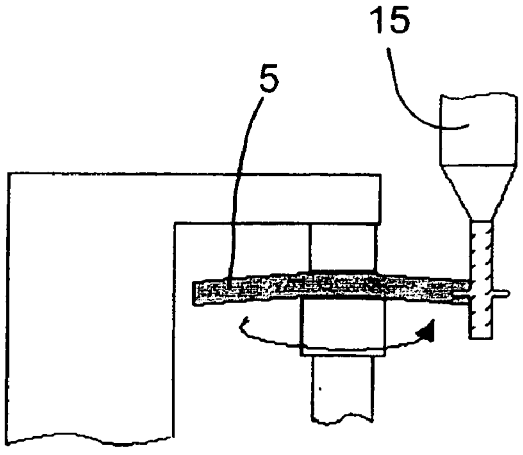

FIG. 8 shows a contour milling simultaneously with a grooving of contour (or a grooving of contour after the operation of milling of contour)

Figure 9:
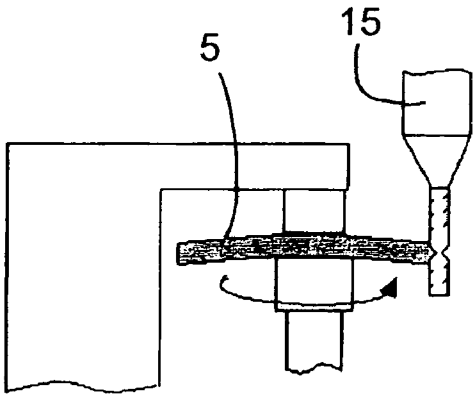

FIG. 9 shows a contour milling simultaneously with a double bevelling of contour (or a double bevelling of contour after a milling operation of contour)

Figure 10:
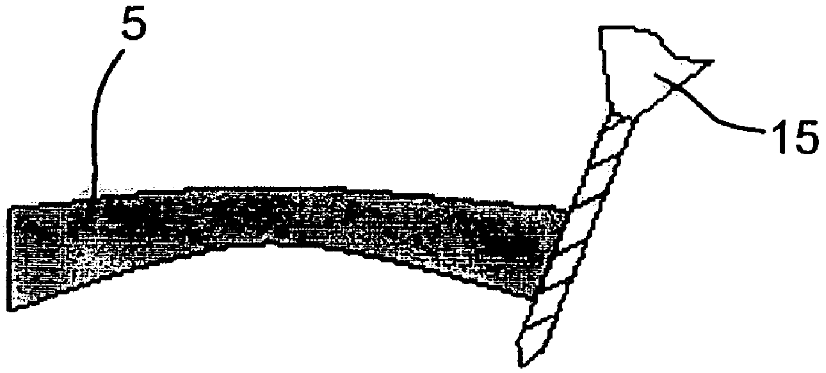

FIG. 10 shows a bevelling after a milling operation, wherein the cutting tool 19 rotates about and axis forming a not null angle with the first rotation axis 7

Figure 11:
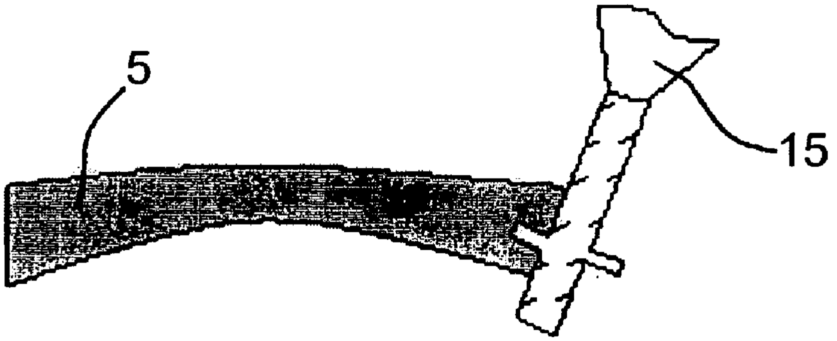

FIG. 11 shows the mechanisation of a grooving with a groove angle substantially parallel to the internal face of the lens 5, an operation that can be also performed thanks to the fact that the cutting tool 19 rotates about an axis forming a not null angle with the first rotation axis 7

Figure 12:
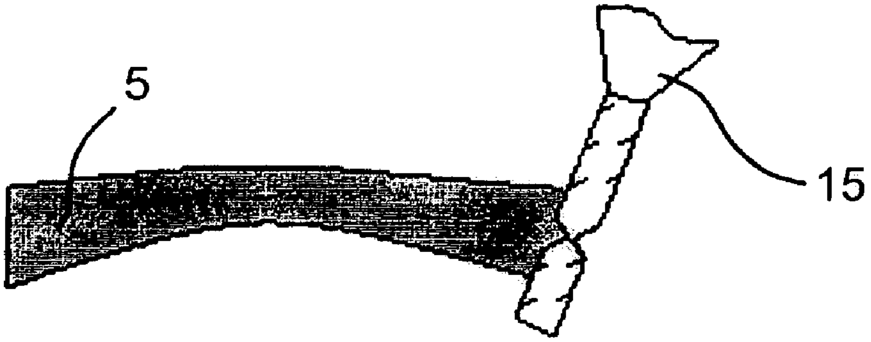

FIG. 12 shows how it is possible to machine special bevelling through a tool 19 of simple form and taking advantage of the adjustable inclination of the head 15

Figure 13:
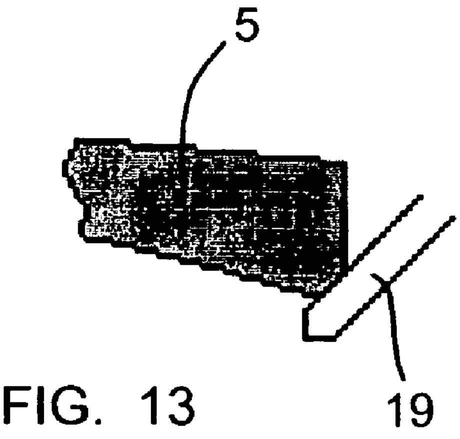
Figure 14:
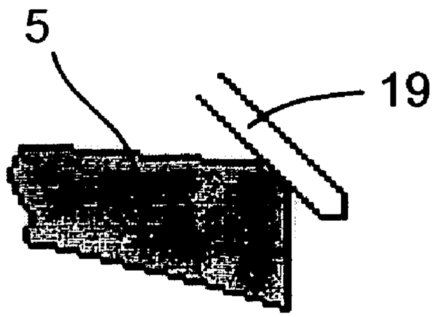
Figure 16:
FIG. 16, a schematic view of a polishing operation.

FIGS. 13 and 14 show two different bevellings that can be carried out in the same equipment, with the same tool 19 and without needing to stop the working cycle.

It can be noted that all these operations, together with the bores, can be carried out in the same machine and with a single positioning and attachment operation of the lens 5 and, at most, with some tool shifting.

The invention claimed is:

1. Numeric control bore for boring an eyeglass lens (5) comprising:

a support bedplate (1), attachment means (3) of said lens (5) in a first position, rotation means (9) of said lens (5) according to a first rotation axis (7) perpendicular to the plane of the lens defined by said lens (5), defining a first degree of freedom, a support column (11) with a machining head (15), said attachment means (3) and said support column (11) are capable of being moved one with respect to the other according a direction comprised in said plane of the lens, defining a second degree of freedom, said support column (11) has a first end linked to said bedplate capable of rotating about a second rotation axis (13) parallel to said plane of the lens, defining a third degree of freedom, said apparatus only having four degrees of freedom in order to fix the relative position between said head (15) and said lens (5).

2. Bore according to claim 1, wherein said second rotation axis (13) is arranged at a height equal to or lower than the upper end of said lens (5).

3. Bore according to claim 1, wherein feeler means (29) of the lens (5) operate in the normal direction to said lens (5).

4. Bore according to claim 3, wherein said feeler means (29) act on the lens (5) in a translation direction of said head (15).

5. Bore according to claim 1, further comprising second attachment means (27) of said lens (5) in a second position, wherein said lens (5) in said second position has its plane of the lens rotated 90 degrees with respect to the plane of the lens (5) when it is in said first position.

6. Machining method of an eyeglass lens (5) in a numeric control bore according to claim 1, comprising the following steps:

positioning and attachment of said lens (5) in said bore, carrying out at least a machining operation of the group formed by boring, blind hole milling, groove pin milling, recessing, carving, polishing, contour milling, contour bevelling, contour grooving and edge planing, in said bore, and removing said lens (5) from said bore.

7. Method according to claim 6, wherein at least two of said machining operations are consecutively carried out.

8. Method according to claim 6, wherein at least two of said machining operations are simultaneously carried out.

9. Method according to claim 6, wherein during said machining operation, the cutting tool rotates about an axis forming a non null angle with said first rotation axis (7).

* * * * *